US012691658B2

(12) United States Patent     (10) Patent No.: US 12,691,658 B2

Ponsolle et al.     (45) Date of Patent: Jul. 28, 2026

---

(54) PROCESS FOR MANUFACTURING COMPOSITE ARTICLES, AND COMPOSITE ARTICLES MADE THEREBY

(71) Applicant: Cytec Industries, Inc., Princeton, NJ (US)

(72) Inventors: Dominique Ponsolle, Winona, MN (US); Pierre-Yves Lahary, Lyons (FR); Christiane Prebet, Taluyers (FR)

(73) Assignee: Cytec Industries Inc., Stamford, CT (US)

( * ) Notice: Subject to any disclaimer, the term of this patent is extended or adjusted under 35 U.S.C. 154(b) by 433 days.

(21) Appl. No.: 18/567,642

(22) PCT Filed: Apr. 25, 2022

(86) PCT No.: PCT/US2022/026142

§ 371 (c)(1),
(2) Date: Dec. 6, 2023

(87) PCT Pub. No.: WO2022/265727

PCT Pub. Date: Dec. 22, 2022

(65) Prior Publication Data

US 2024/0269957 A1     Aug. 15, 2024

Related U.S. Application Data

(60) Provisional application No. 63/210,168, filed on Jun. 14, 2021.

(51) Int. Cl.
    *B32B 5/06*       (2006.01)
    *B29C 70/08*     (2006.01)
        (Continued)

(52) U.S. Cl.
    CPC .............. *B32B 5/073* (2021.05); *B29C 70/08* (2013.01); *B29C 70/228* (2013.01); *B29C 70/54* (2013.01);
        (Continued)

(58) Field of Classification Search
    CPC ..... Y10T 428/24058; Y10T 428/24074; Y10T 428/24091; Y10T 428/24099;
        (Continued)

(56) References Cited

U.S. PATENT DOCUMENTS 8,613,257 B2    12/2013    Wockatz
9,695,533 B2    7/2017    Beraud et al.
         (Continued)

FOREIGN PATENT DOCUMENTS

EP       1317501 B1 * 11/2006   ............... C08J 3/24
JP       201292338 A     5/2012
         (Continued)

OTHER PUBLICATIONS

Beier U. et al.: "Evaluation of preforms stitched with a low melting-temperature thermoplastic yarn in carbon fibre-reinforced composites", Composites Part A, Elsevier, Amsterdam, NL, vol. 39, No. 5, May 1, 2008, pp. 705-711.
         (Continued)

*Primary Examiner* — Maria V Ewald
*Assistant Examiner* — Ethan A. Utt
(74) *Attorney, Agent, or Firm* — Thi Dang

(57)         ABSTRACT

The present disclosure relates to a process for manufacturing composite articles, and composite articles made thereby. The processes described herein make use of curable compositions containing NCF fabrics having certain types of stitching yarns. The curable compositions and composite articles made according to the present disclosure are particularly suited to the production of composite parts for use in many (Continued)

applications, such as in aviation, automotive, and marine applications.

20 Claims, 1 Drawing Sheet

(51) Int. Cl.

| | |
|---|---|
| *B29C 70/22* | (2006.01) |
| *B29C 70/44* | (2006.01) |
| *B29C 70/54* | (2006.01) |
| *B29C 70/88* | (2006.01) |
| *B29K 63/00* | (2006.01) |
| *B29K 105/08* | (2006.01) |
| *B29K 307/04* | (2006.01) |
| *B32B 5/26* | (2006.01) |

(52) U.S. Cl.
CPC .............. *B29C 70/88* (2013.01); *B32B 5/26* (2013.01); *B29C 70/443* (2013.01); *B29K 2063/00* (2013.01); *B29K 2105/0809* (2013.01); *B29K 2105/0881* (2013.01); *B29K 2307/04* (2013.01); *B32B 2250/20* (2013.01); *B32B 2260/023* (2013.01); *B32B 2260/046* (2013.01); *B32B 2262/0261* (2013.01); *B32B 2262/0276* (2013.01); *B32B 2262/106* (2013.01); *B32B 2262/14* (2013.01); *B32B 2262/16* (2021.05); *B32B 2307/516* (2013.01); *B32B 2307/554* (2013.01)

(58) Field of Classification Search
CPC ..... Y10T 428/24107; Y10T 428/24116; Y10T 428/24124; Y10T 428/24132; B32B 5/00; B32B 5/02; B32B 5/022; B32B 5/06; B32B 5/073; B32B 5/12; B32B 5/22; B32B 5/24; B32B 5/26; B32B 5/265; B32B 5/266; B32B 7/00; B32B 7/04; B32B 7/08; B32B 7/09; B29C 70/00; B29C 70/04; B29C 70/06; B29C 70/10; B29C 70/16; B29C 70/20; B29C 70/202; B29C 70/22; B29C 70/226; B29C 70/28; B29C 70/54; B29C 70/88
USPC ........ 428/105, 107, 109, 110, 111, 112, 113, 428/114
See application file for complete search history.

(56) References Cited

U.S. PATENT DOCUMENTS

| | | | |
|---|---|---|---|
| 2012/0108132 A1 | 5/2012 | Fang et al. | |
| 2015/0266268 A1* | 9/2015 | Coxon | ................. B29C 70/226 156/307.1 |
| 2020/0385906 A1 | 12/2020 | Ponsolle et al. | |

FOREIGN PATENT DOCUMENTS

| | | | |
|---|---|---|---|
| JP | 201999987 A | 6/2019 | |
| WO | 2013141916 A2 | 9/2013 | |
| WO | 2015130368 A2 | 9/2015 | |
| WO | 2016003763 A2 | 1/2016 | |
| WO | 2016048885 A1 | 3/2016 | |
| WO | 2017083631 A1 | 5/2017 | |
| WO | WO-2019113025 A1 * | 6/2019 | ............. B29C 70/24 |

OTHER PUBLICATIONS

Hexcel, HexFlow® RTM6/RTM6-2, Product Data Sheet, 2024.
Chou et al.; "Composite Materials Series-3: Textile Structural Composites" Elsevier Science Publishers B.V.; vol. 3; Chapter 5; Paragraph 3.3; 1989; pp. 480 (2 pages).
Beier et al.; "Evaluation of preforms stitched with a low melting-temperature thermoplastic yarn in carbon fibre-reinforced composites;" Composites Part A; vol. 39; No. 5; May 1, 2008; pp. 705-711 (7 pages).
International Search Report issued in Application No. PCT/US2022/026142, mailed on Jul. 27, 2022 (3 pages).
Written Opinion issued in Application No. PCT/US2022/026142, mailed on Jul. 27, 2022 (5 pages).

* cited by examiner

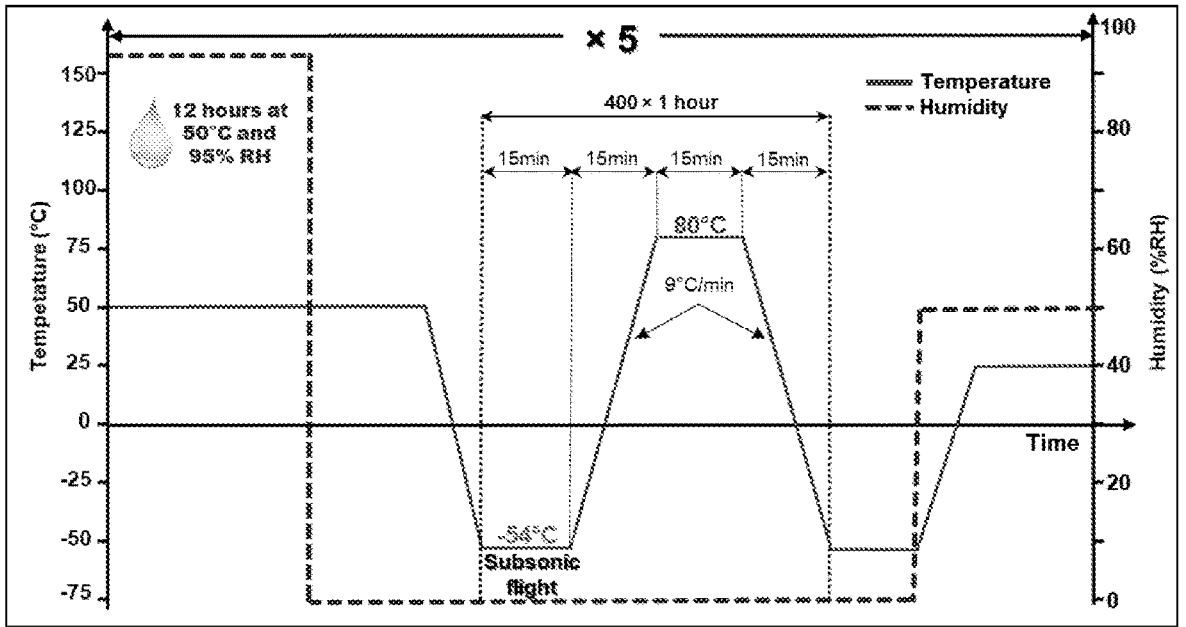

PROCESS FOR MANUFACTURING COMPOSITE ARTICLES, AND COMPOSITE ARTICLES MADE THEREBY

CROSS REFERENCE TO RELATED APPLICATIONS

This present application is a national stage entry of PCT/US2022/026142, filed on Dec. 12, 2022 which claims priority to U.S. provisional application No. 63/210,168, filed Jun. 14, 2021, the entire contents of which are hereby incorporated by reference.

FIELD OF THE INVENTION

The present invention relates to a process for manufacturing composite articles, and composite articles made thereby. The processes described herein make use of curable compositions containing NCF fabrics having certain types of stitching yarns. The curable compositions and composite articles made according to the present disclosure are particularly suited to the production of composite parts for use in many applications, such as in aviation, automotive, and marine applications.

BACKGROUND

Fiber-Reinforced Polymer ("FRP") composites are promoted as the modern replacement material for more traditional materials in a variety of applications, including in the aircraft, automotive, marine, industrial, and infrastructure/ building fields. Specifically, FRP composites can be used to replace metals and alloys, such as steel and aluminum, as well as concrete depending on the application field.

The push for FRP composites can be attributed to a variety of factors such as the desire for metal replacement alternatives, as well as light-weight materials having a balance of desired properties that can include toughness and chemical resistance. More specifically, maintaining or even increasing the desired properties for FRP composites, while at the same time reducing the overall weight, eliminating the issues associated with metal fatigue and corrosion, thus allowing for the production of aircraft, automotive and transport vehicles, and marine vessels, and parts thereof, that have better fuel economy without sacrificing performance of the same. Further, by manufacturing parts and components for aircrafts, vehicles, and vessels using FRP composites, not only can the overall weight of the aircrafts, vehicles, and vessels be reduced, but the time required to make and machine the parts and components can be reduced. Similarly, with respect to construction and infrastructure applications, FRP composites can offer alternatives to traditional building and construction materials, while reducing the overall cost, weight (and associated stresses and loads) of the structure, and time needed to construct (i.e., through prefabrication processes) and maintain the same.

In order to produce FRP composites, reinforcement fibers, which may be provided in various forms, such as non-crimped fabrics, are combined with a matrix resin. The combination is then cured, typically in a mold, at a given temperature and pressure to form the end FRP composite. Yet, the resulting FRP composites can lack the desired strength and toughness for certain applications, especially for aircraft applications.

Noncrimped fabrics (NCF) generally comprise one or more layers of structural fibers, filaments, or yarn, each layer having the fibers, filaments, or yarns oriented in discrete directions. The fibers, filaments, or yarn are also referred to as reinforcement fibers, filaments, or yarn. Such noncrimped fabrics may also further comprise one or more interlaminar layers each comprising, for example, a web, weave, veil, scrim, and the like. The layers are typically consolidated by a stitching yarn.

Composite parts, such as NCF composites, are often subjected to thermal cycles and humid periods, when used in various applications. With temperature changes, such composite parts experience expansion and contraction in different directions depending on its coefficient of thermal expansion (CTE), which depends on the orientation of the plies. With an independent and stress-free ply, expansion or contraction occurs with caution, and no stress is produced, regardless of the orientation of the ply. But when the plies are turned in different orientations and laminated together, each ply will not be able to expand or contract according to its own CTE due to the stress of adjacent plies. This results in high stresses in the plies. As the matrix has a lower in situ failure stress than the fiber, microcracks typically occur in the matrix. Furthermore, it is known that the introduction of stitching, which is typically used to secure the plies together, can create areas in the vicinity of the stitching yarn that are prone to microcrack formation as a result of the expansion or contraction of the plies. Microcracking can lead to profound changes in properties, such as rigidity. Thus, the mitigation of microcrack formation has a been a topic of investigation in the field.

U.S. Pat. No. 9,695,533 to Beraud et al, and U.S. Pat. No. 8,613,257 to Wockatz describe strategies for minimizing the size of resin-rich zones in composite parts by reducing the titer of the stitching yarn in order to improve microcracking behavior of the composite and mechanical properties in in-plane direction of the composite, respectively. However, the described improvements in microcracking behavior are not sufficient for certain applications.

Thus, there is an ongoing need to mitigate or prevent the appearance of microcracks in composite parts, especially those made from NCF, and that are subjected to hygrothermal stresses. Herein, a new strategy for limiting microcracking behavior of composite articles is described in which certain curable compositions are cured according to an inventive process.

SUMMARY OF THE INVENTION

This objective, and others which will become apparent from the following detailed description, are met, in whole or in part, by the compositions, methods and/or processes of the present disclosure.

In a first aspect, the present disclosure relates to a process for manufacturing a composite article, the process comprising:

a) providing a curable composition, the curable composition comprising a matrix resin and a non-crimp fabric comprising at least one layer of unidirectionally oriented multifilament carbon yarns and a multifilament stitching yarn interlinking the multifilament carbon yarns, wherein the stitching yarn comprises a thermoplastic polymer and has a linear density of less than or equal to 80 dtex;

b) heating the curable composition to a temperature $T_1$, wherein $T_1$ is greater than the melting temperature ($T_m$) of the stitching yarn and wherein the conversion of the matrix resin at $T_m$ or at $T_1$ is less than or equal to 30%, typically less than or equal to 20%, more typically less than or equal to 10%; and c) maintaining the temperature $T_1$ or heating to a temperature $T_2$ for a time sufficient for the curable composition to be cured, thereby manufacturing the composite article.

In a second aspect, the present disclosure relates to a composite article manufactured according to the process described herein.

BRIEF DESCRIPTION OF THE FIGURES

FIG. 1 shows an accelerated hygrothermal load representative of the operating conditions typical of a subsonic jet during its life cycle.

DETAILED DESCRIPTION

As used herein, the terms "a", "an", or "the" means "one or more" or "at least one" and may be used interchangeably, unless otherwise stated.

As used herein, the term "and/or" used in a phrase in the form of "A and/or B" means A alone, B alone, or A and B together.

As used herein, the term "comprises" includes "consists essentially of" and "consists of." The term "comprising" includes "consisting essentially of" and "consisting of."

Unless defined otherwise, all technical and scientific terms used herein have the same meaning as is commonly understood by one of skill in the art to which this specification pertains.

As used herein, and unless otherwise indicated, the term "about" or "approximately" means an acceptable error for a particular value as determined by one of ordinary skill in the art, which depends in part on how the value is measured or determined. In certain embodiments, the term "about" or "approximately" means within 1, 2, 3, or 4 standard deviations. In certain embodiments, the term "about" or "approximately" means within 50%, 20%, 15%, 10%, 9%, 8%, 7%, 6%, 5%, 4%, 3%, 2%, 1%, 0.5%, or 0.05% of a given value or range.

Also, it should be understood that any numerical range recited herein is intended to include all sub-ranges subsumed therein. For example, a range of "1 to 10" is intended to include all sub-ranges between and including the recited minimum value of 1 and the recited maximum value of 10; that is, having a minimum value equal to or greater than 1 and a maximum value of equal to or less than 10. Because the disclosed numerical ranges are continuous, they include every value between the minimum and maximum values. Unless expressly indicated otherwise, the various numerical ranges specified in this application are approximations.

Throughout the present disclosure, various publications may be incorporated by reference. Should the meaning of any language in such publications incorporated by reference conflict with the meaning of the language of the present disclosure, the meaning of the language of the present disclosure shall take precedence, unless otherwise indicated.

In the first aspect, the present disclosure relates to a process for manufacturing a composite article, the process comprising:

a) providing a curable composition, the curable composition comprising a matrix resin and a non-crimp fabric comprising at least one layer of unidirectionally oriented multifilament carbon yarns and a multifilament stitching yarn interlinking the multifilament carbon yarns, wherein the stitching yarn comprises a thermoplastic polymer and has a linear density of less than or equal to 80 dtex;

b) heating the curable composition to a temperature $T_1$, wherein $T_1$ is greater than the melting temperature ($T_m$) of the stitching yarn and wherein the conversion of the curable composition at $T_m$ or at $T_1$ is less than or equal to 30%, typically less than or equal to 20%, more typically less than or equal to 10%; and c) maintaining the temperature $T_1$ or heating to a temperature $T_2$ for a time sufficient for the curable composition to be cured, thereby manufacturing the composite article.

In step a) of the process, a curable composition comprising a matrix resin and a non-crimp fabric comprising at least one layer of unidirectionally oriented multifilament carbon yarns and a multifilament stitching yarn interlinking the multifilament carbon yarns, wherein the stitching yarn comprises a thermoplastic polymer and has a linear density of less than or equal to 80 dtex, is provided.

The term "non-crimp fabric" or "non-crimped fabric", sometimes "NCF", refers to a construct comprising one or more layers of fibers, filaments, or yarns. The fibers, filaments, or yarns in a single layer are arranged such that they are parallel to each other and oriented in a single direction (i.e., unidirectional). Multiple layers may be stacked so that the fibers, filaments, or yarns of one layer are oriented parallel to the fibers, filaments, or yarns of an adjacent layer or are oriented crosswise to the fibers, filaments, or yarns of an adjacent layer. When the fibers, filaments, or yarns of one layer are oriented crosswise to the fibers, filaments, or yarns of an adjacent layer, the angles between the axis of one layer, the axis being determined by the direction of the fibers, filaments, or yarns in the layer, and that of the axis of the adjacent layer are virtually infinitely adjustable. For example, the angles between adjacent fiber layers may be 0° or 90°, or such angles plus or minus 25°, plus or minus 30°, plus or minus 45°, or plus or minus 60°, the zero-degree direction being determined by methods known to those of ordinary skill in the art. For example, the machine direction may be designated as the 0° direction. Accordingly, the term "multiaxial" refers to an NCF fabric having more than one layer, each layer oriented in various directions. Multiaxial fabrics include biaxial fabrics in which the layers are oriented in two directions and triaxial fabrics in which the layers are oriented in three directions, and so on. Multiaxial non-crimp fabrics can be produced e.g. by means of warp knitting looms or stitch bonding machines.

In an embodiment, the non-crimp fabric comprises one layer of unidirectionally oriented multifilament carbon yarns.

In another embodiment, the non-crimp fabric comprises more than one layer of unidirectionally oriented multifilament carbon yarns.

In an embodiment, the non-crimp fabric comprises more than one layer of unidirectionally oriented multifilament carbon yarns, which layers are oriented in the same direction. In another embodiment, the non-crimp fabric comprises more than one layer of unidirectionally oriented multifilament carbon yarns, which layers are oriented in different directions.

As used herein, a yarn is a continuous strand of one or more fibers, one or more filaments, or material in a form suitable for use in the production of textiles, sewing, crocheting, knitting, weaving, stitching, etc. Yarns include, for example, (1) a plurality of filaments laid or bundled together without applied or intentional twist, sometimes referred to as a zero-twist yarn or a non-twisted yarn; (2) a plurality of filaments laid or bundled together and are either interlaced, have false-twist, or are textured in some manner; (3) a plurality of filaments laid or bundled together with a degree of twist, sometimes referred to as a twisted yarn; (4) a single filament with or without twist, sometimes referred to a monofilament or monofilament yarn. Textured yarns may be filament or spun yarns that have been given noticeably greater volume through physical, chemical, or heat treatments or a combination of these. In some instances a yarn is called a filament yarn or a multifilament yarn, both of which are generally yarns made from a plurality of filaments.

As used herein, "fiber" refers to a material having a high ratio of length to thickness. Fibers may be continuous, in which case such fibers are referred to as filaments, or staple length (i.e., discrete length).

Thus, in an embodiment, the stitching yarn comprises one or more thermoplastic fibers or filaments.

The unidirectionally oriented multifilament carbon yarns within a single layer of the NCF of the present disclosure are interlinked by a multifilament stitching yarn having certain properties that contribute to reducing the size of separation zones, such as fisheyes, in the NCF fabric, and, thus, reducing the size of undesirable resin-rich zones in composite articles made from the NCF fabric.

The stitching yarn comprises a thermoplastic polymer and has a linear density of less than or equal to 80 dtex.

The thermoplastic polymer may be any thermoplastic polymer known to those of ordinary skill in the art. Exemplary thermoplastic polymers include, but are not limited to polycarbonates, polyurethanes, and copolymers thereof. Suitable copolymers include, but are not limited to, copolyesters, copolyamides, copolyimides, copolycarbonates, copolyurethanes, polyesteramides, polyamideimides, polyaramides, polyphtalamides, and poly(ester) carbonates.

In an embodiment, the thermoplastic polymer comprises polyamide, polyester, or blends or copolymers thereof.

Examples of suitable polyamides include, but are not limited to, PA 6, PA 6/6, PA 6T, PA 12, PA 6/10, PA 9T, PA 10/10, PA 10T, PA11, PA 6/12, PA 10/12, PA 6/18, PA 6/36, PA 4/6, PA 4T, and blends or copolymers thereof.

In an embodiment, the thermoplastic polymer of the stitching yarn is a semi-crystalline polymer.

The stitching yarn may be characterized by its melting temperature, or $T_m$. In an embodiment, the stitching yarn has a melting temperature of less than or equal to 230° C., typically less than or equal to 220° C. In another embodiment, the melting temperature of the stitching yarn is from 70° C. to 200° C., typically 90° C. to 180° C.

The multifilament stitching yarn may be characterized by certain properties, such as linear mass density and/or filament count (when the yarn comprises more than one filament).

The linear mass density of the yarn is given in units of tex, or more commonly decitex (dtex). One tex is defined as the mass in grams per 1000 meters of the yarn. Accordingly, one dtex is the mass in grams per 10,000 meters of yarn. In accordance with the present invention, the linear density of the multifilament stitching yarn is less than or equal to 80 dtex. Typically, the linear density of the multifilament stitching yarn is in the range of 1 to 55 dtex, more typically 1 to 40 dtex. In an embodiment, the linear density of the multifilament stitching yarn is in the range of 15 to 55 dtex.

The fibers or filaments of the multifilament stitching yarn may be characterized by density. As used herein, the density refers to the density of the polymer material used in manufacturing the fibers. The fibers or filaments of the multifilament stitching yarn have a density of from 0.5 to 2.0 g/cm³, typically from 0.8 to 1.8 g/cm³, more typically from 0.9 to 1.5 g/cm³. In an embodiment, the fibers or filaments of the multifilament stitching yarn have a density of from 0.9 to 1.4 g/cm³.

Filament count, as used herein, is the number of filaments making up the yarn. The filament count of the multifilament stitching yarn is less than or equal to 1.0 times the dtex value of the stitching yarn, typically less than or equal to 0.9 times the dtex value, more typically less than or equal to 0.8 times the dtex value.

In some embodiments, the filament count is in the range of 0.1 to 0.8 times the dtex value of the yarn, typically 0.1 to 0.6 times the dtex value of the yarn, more typically 0.1 to 0.5 times the dtex value of the yarn.

The fibers or filaments of the multifilament stitching yarn may be interlaced, also referred to as entangled or intermingled, according to methods known to those of ordinary-skill in the art. For example, yarn filaments may be interlaced by exposing a plurality of filaments to a localized fluid jet, such as an air stream. Interlacing gives rise to points of entanglement, called nodes, which are separated by spaces of unentangled filaments.

The stitching yarn may also be characterized by twist. As used herein, twist refers to the spiral arrangement of the fibers or filaments around the axis of a yarn. The multifilament stitching yarn of the present disclosure may or may not contain twist. Twist, when present, is provided as the number of revolutions per unit length, typically revolutions per meter. The multifilament stitching yarn generally has a twist of less than 200 revolutions per meter. In an embodiment, the stitching yarn has a twist of less than 150 r/m, typically less than 100 r/m, more typically less than 50 r/m. In an embodiment, the stitching yarn has no twist.

In an embodiment, the non-crimp fabric is multiaxial and comprises more than one layer of unidirectionally oriented multifilament carbon yarns. The layers of a multiaxial NCF fabric can be connected and secured to each other according to methods known to those of ordinary skill in the art, for example, by a plurality of stitching or knitting threads arranged parallel to each other and running parallel to each other and forming stitches. The stitching or knitting threads used to connect and secure the layers of the multiaxial NCF fabric to each other may be the same as or different from the multifilament stitching yarn described herein. In an embodiment, the stitching or knitting threads used to connect and secure the layers of the multiaxial NCF fabric to each other is the same as the multifilament stitching yarn described herein.

The multifilament stitching yarn holds together the unidirectionally oriented multifilament yarns within a single layer of the NCF and/or secures two or more layers in the NCF fabric to one another, and does not provide any structural reinenforcement. Thus, the multifilament stitching yarn used according to the present disclosure for interlinking of the unidirectionally oriented multifilament carbon yarns within a single layer of the NCF and/or the consolidation of two or more layers in the NCF fabric is non-structural. In contrast, the unidirectionally oriented multifilament carbon yarns are structural as they provide structural reinforcement in a composite material or article made therefrom.

The non crimp fabric may further comprise one or more layers of a veil, typically nonwoven veil. For example, the non crimp fabric may comprise a layer of unidirectionally oriented multifilament carbon yarns combined with a layer of a veil. Any veil known to those of ordinary skill in the art may be used. The layers constituting the NCF fabric, including the one or more layers of veil, can be connected and secured to each other according to methods known to those of ordinary skill in the art, for example, by a plurality of stitching or knitting threads. The veil layer, when used, advantageously provides improved process performance, such as permeability, as well as mechanical performance, such as impact and delamination resistance. Exemplary veils that may be used are described in PCT Publications WO 2017/083631 and WO 2016/003763, which are incorporated by reference. The veil may be made from materials well-known to those of ordinary skill in the art.

The non-crimp fabric may be obtained from commercial sources or made according to methods known to those of ordinary skill in the art. Unidirectionally oriented multifilament carbon yarns may be interlinked to form a single layer of NCF. A plurality of such single layers of NCF may be combined to form a multilayer NCF fabric in which the plurality of layers are interlinked using the stitching yarn described herein.

The interlinking of the unidirectionally oriented multifilament carbon yarns within a single layer of the NCF and/or the consolidation of two or more layers in the NCF fabric may be achieved using various stitch types, stitch width (i.e., the distance between the points in the weft direction), and stitch lengths (i.e., the distance between the points in the warp direction) known to those of ordinary skill in the art. Suitable stitch patterns include straight stitches, chain stitches, lock stitches, zig-zag stitches, tricot stitches, or a combination thereof. In an embodiment, the stitch pattern is a tricot stitch, typically zig-zag tricot stitch. There is no particular limitation to the stitch width and the stitch length that may be used. For example, the stitch width may be in the range of 1 to 20 mm, typically 1 to 10 mm. The stitch length may be in the range of 1 to 20 mm, typically 1 to 10 mm, for instance.

When the NCF fabric comprises more than one layer, the multiple layers may be connected and secured to each other by stitching or knitting according to known methods using a stitching yarn, such as the multifilament stitching yarn described herein. When the NCF fabric is multiaxial, the production of such multiaxial NCF is known and makes use of conventional techniques, described, for instance, in the book "Textile Structural Composites, Composite Materials Series Volume 3" by Tsu Wei Chou & Franck K. Ko, ISBN-0-44442992-1, Elsevier Science Publishers B. V., 1989, Chapter 5, paragraph 3.3.

Curable compositions may be provided by molding a support structure comprising the NCF described herein and infusing or injecting the support structure with a thermosetting resin in a number of liquid-molding processes.

As used herein, the term "support structure" refers to a construct in which one or more layers of reinforcement material, such as the NCF fabric described herein, are laid without matrix resin in a mold for further processing, such as infusion or injection of matrix resin, to form a curable composition, which in turn may be cured to form a composite article. An example of a support structure is a fiber preform.

The support structure may further comprise layers of any type of textiles known to those of ordinary skill for manufacturing composite materials. Examples of suitable fabric types or configurations include, but are not limited to: all woven fabrics, examples of which are plain weave, twill weave, sateen weave, spiral weave, and uni-weave fabrics; warp-knitted fabrics; knitted fabrics; braided fabrics; all non-woven fabrics, examples of which include, but are not limited to, nonwoven veils, mat fabrics composed of chopped and/or continuous fiber filaments, felts, and combinations of the aforementioned fabric types.

In an embodiment, the support structure may further comprise a veil, typically nonwoven veil. Any veil known to those of ordinary skill in the art may be used. For example, the veil described in PCT International Publication WO 2017/083631 may be used. A binder component may be distributed on at least one side of the veil layer or penetrated through portions of the veil, or distributed throughout the non-crimp fabric, including in spaces between the unidirectionally oriented fibers and on portions of the veil. For example, the binders described in PCT International Publication WO 2016/003763, which is incorporated herein by reference, may be used. The binder may be present in an amount less than or equal to 15% by weight or less of the final fabric. Typically, the binder component does not form a continuous film at the surface of the fibrous material. The veil may be made from materials well-known to those of ordinary skill in the art. For instance, the veil may be made from the same material as the stitching thread described herein.

Liquid-molding processes that may be used include, without limitation, vacuum-assisted resin transfer molding (VARTM), in which resin is infused into the support structure using a vacuum-generated pressure differential. Another method is resin transfer molding (RTM), wherein resin is infused under pressure into the support structure in a closed mold. A third method is resin film infusion (RFI), wherein a semi-solid resin is placed underneath or on top of the support structure, appropriate tooling is located on the part, the part is bagged and then placed in an autoclave to melt and infuse the resin into the support structure The matrix resin for impregnating, infusing, or injecting the support structure described herein comprises a curable resin and, optionally, suitable additives known to those of ordinary skill in the art. "Curing" or "cure" in the present disclosure refers to the hardening of a polymeric material by the chemical cross-linking of the polymer chains. The term "curable" in reference to a composition means that the composition is capable of being subjected to conditions which will render the composition to a hardened state. In an embodiment, the matrix resin is a thermoset resin composition containing one or more uncured thermoset resins.

Suitable thermoset resins include, but are not limited to, epoxy resins, oxetanes, imides (such as polyimide or bis-maleimide), vinyl ester resins, cyanate ester resins, isocyanate-modified epoxy resins, phenolic resins, furanic resins, benzoxazines, formaldehyde condensate resins (such as with urea, melamine or phenol), polyesters, acrylics, hybrids, blends and combinations thereof.

Suitable epoxy resins include glycidyl derivatives of aromatic diamine, aromatic mono primary amines, aminophenols, polyhydric phenols, polyhydric alcohols, polycarboxylic acids and non-glycidyl resins produced by peroxidation of olefinic double bonds. Examples of suitable epoxy resins include polyglycidyl ethers of the bisphenols, such as bisphenol A, bisphenol F, bisphenol S, bisphenol K and bisphenol Z; polyglycidyl ethers of cresol and phenol-based novolacs, glycidyl ethers of phenol-aldelyde adducts, glycidyl ethers of aliphatic dials, diglycidyl ether, diethylene glycol diglycidyl ether, aromatic epoxy resins, aliphatic polyglycidylethers, epoxidised olefins, brominated resins, aromatic glycidyl amines, heterocyclic glycidyl imidines and amides, glycidyl ethers, fluorinated epoxy resins, or combinations thereof.

Specific examples are tetraglycidyl derivatives of 4,4'-diaminodiphenylmethane (TGDDM), resorcinol diglycidyl ether, triglycidyl-p-aminophenol, triglycidyl-m-aminophenol, bromobisphenol F diglycidyl ether, tetraglycidyl derivatives of diaminodiphenylmethane, trihydroxyphenyl methane triglycidyl ether, polyglycidylether of phenol-formaldehyde novolac, polyglycidylether of o-cresol novolac or tetraglycidyl ether of tetraphenylethane.

Suitable oxetane compounds, which are compounds that comprise at least one oxetano group per molecule, include compounds such as, for example, 3-ethyl-3[[(3-ethyloxetane-3-yl)methoxy]methyl]oxetane, oxetane-3-methanol, 3,3-bis-(hydroxymethyl) oxetane, 3-butyl-3-methyl oxetane, 3-methyl-3-oxetanemethanol, 3,3-dipropyl oxetane, and 3-ethyl-3-(hydroxymethyl) oxetane.

In an embodiment, the matrix resin comprises epoxy resin.

The curable matrix resin may optionally comprise one or more additives such as curing agents, curing catalysts, co-monomers, rheology control agents, tackifiers, inorganic or organic fillers, thermoplastic and/or elastomeric polymers as toughening agents, stabilizers, inhibitors, pigments, dyes, flame retardants, reactive diluents, UV absorbers and other additives well known to those of ordinary skill in the art for modifying the properties of the matrix resin before and/or after curing.

Examples of suitable curing agents include, but are not limited to, aromatic, aliphatic and alicyclic amines, or guanidine derivatives. Suitable aromatic amines include 4,4'-diaminodiphenyl sulphone (4,4'-DDS), and 3,3'diaminodiphenyl sulphone (3,3'-DDS), 1,3-diaminobenzene, 1,4-diaminobenzene, 4,4'-diammodiphenylmethane, benzenediamine (BDA); Suitable aliphatic amines include ethylenediamine (EDA), 4,4'-methylenebis(2,6-diethylaniline) (M-DEA), m-xylenediamine (mXDA), diethylenetriamine (DETA), triethylenetetramine (TETA), trioxatridecanediamine (TTDA), polyoxypropylene diamine, and further homologues, alicyclic amines such as diaminocyclohexane (DACH), isophoronediamine (IPDA), 4,4' diamino dicyclohexyl methane (PACM), bisaminopropylpiperazine (BAPP), N-aminoethylpiperazine (N-AEP); Other suitable curing agents also include anhydrides, typically polycarboxylic anhydrides, such as nadic anhydride, methylnadic anhydride, phthalic anhydride, tetrahydrophthalic anhydride, hexahydrophthalic anhydride, methyltetrahydrophthalic anhydride, methylhexahydrophthalic anhydride, endomethylene-tetrahydrophtalic anhydride, pyromellitic dianhydride, chloroendic anliydride and trimellitic anhydride.

Still other curing agents are Lewis acid:Lewis base complexes. Suitable Lewis acid:Lewis base complexes include, for example, complexes of: $BCl_3$:amine complexes, $BF_3$: amine complexes, such as $BF_3$:monoethylamine, $BF_3$:propylamine, $BF_3$:isopropyl amine, $BF_3$:benzyl amine, $BF_3$: chlorobenzyl amine, $BF_3$:trimethylamine, $BF_3$:pyridine, $BF_3$:THF, $AlCl_3$:THF, $AlCl_3$:acetonitrile, and $ZnCl_2$:THF.

Additional curing agents are polyamides, polyamines, amidoamines, polyamidoamines, polycycloaliphatic, polyetheramide, imidazoles, dicyandiamide, substituted ureas and urones, hydrazines and silicones.

Urea based curing agents are the range of materials available under the commercial name DYHARD (marketed by Alzchem), and urea derivatives, such as the ones commercially available as UR200, UR300, UR400, UR600 and UR700. Urone accelerators include, for example, 4,4-methylene diphenylene bis(N,N-dimethyl urea) (available from Onmicure as U52 M).

When present, the total amount of curing agent is in the range of 1 wt % to 60 wt % of the resin composition. Typically, the curing agent is present in the range of 15 wt % to 50 wt %, more typically in the range of 20 wt % to 30 wt %.

Suitable toughening agents may include, but are not limited to, homopolymers or copolymers either alone or in combination of polyamides, copolyamides, polyimides, aramids, polyketones, polyetherimides (PEI), polyetherketones (PEK), polyetherketoneketone (PEKK), polyetheretherketones (PEEK), polyethersulfones (PES), polyetherethersulfones (PEES), polyesters, polyurethanes, polysulphones, polysulphides, polyphenylene oxide (PPO) and modified PPO, poly(ethylene oxide) (PEO) and polypropylene oxide, polystyrenes, polybutadienes, polyacrylates, polystyrene, polymethacrylates, polyacrylics, polyphenylsulfone, high performance hydrocarbon polymers, liquid crystal polymers, elastomers, segmented elastomers and core-shell particles.

Toughening particles or agents, when present, may be present in the range 0.1 wt % to 30 wt % of the resin composition. In an embodiment, the toughening particles or agents may be present in the range 10 wt % to 25 wt %. In another embodiment, the toughening particles or agents may be present in the range from 0.1 to 10 wt %. Suitable toughening particles or agents include, for example, Virantage VW10200 FRP, VW10300 FP and VW10700 FRP from Solvay, BASF Ultrason E2020 and Sumikaexcel 5003P from Sumitomo Chemicals.

The toughening particles or agents may be in the form of particles having a diameter less than or equal to 5 microns, typically less than or equal to 1 micron in diameter. The size of the toughening particles or agents may be selected such that they are not filtered by the fiber reinforcement. Optionally, the composition may also comprise silica-gels, calcium-silicates, silica oxide, phosphates, molybdates, fumed silica, amorphous silica, amorphous fused silica, clays, such as bentonite, organo-clays, aluminium-trihydrates, hollow glass microspheres, hollow polymeric microspheres, microballoons and calcium carbonate.

The composition may also contain conductive particles such as the ones described in PCT International Publications WO 2013/141916, WO 2015/130368 and WO 2016/048885.

The carbon of the multifilament carbon yarns may be in the form of graphite. The carbon may be metallized with discontinuous or continuous metal layers. Graphite fibers which have been found to be especially useful in the invention are those supplied by Solvay under the trade designations T650-35, T650-42 and T300; those supplied by Toray under the trade designation T700, T800 and T1000; and those supplied by Hexcel under the trade designations AS4, AS7, IM7, IM8 and IM10. The carbon fibers, typically filaments, may be unsized or sized with a material that is compatible with the resin composition.

The mold for resin infusion may be a two-component, closed mold or a vacuum bag sealed, single-sided mold.

The curable composition may be made according to any suitable method known to those of ordinary skill in the art. One suitable method for preparing the curable composition comprises providing the support structure in a mold and then infusing or injecting the one or more layers of the non-crimp fabric with a matrix resin described herein. Generally, the support structure and/or matrix resin are at a certain temperature during the infusion or injection process. Herein, "infusion" or "injection" refers to the combination of the support structure with matrix resin and the terms may be used interchangeably. However, for simplicity, "infusion temperature" will be used to refer to the temperature at which the support structure and matrix resin are combined. Thus, the curable composition may be provided at a certain infusion temperature, which is typically greater than ambient temperature, i.e., greater than 25° C.

In step b) of the process, the curable composition is heated to a temperature $T_1$, wherein $T_1$ is greater than the melting temperature ($T_m$) of the stitching yarn and the conversion of the curable composition at $T_m$ or at $T_1$ is less than or equal to 30%, typically less than or equal to 20%, more typically less than or equal to 10%.

The conversion of the curable composition refers to the percentage of resin that has been converted to polymer. The conversion is determined by differential scanning calorimetry (DSC) using known instruments and methods on a sample of the curable composition. A sample of curable composition can subjected to a desired heating profile using DSC and the conversion of the curable composition can be determined at selected points along the heating profile. In accordance with the present process, the conversion of the curable composition at $T_m$ or at $T_1$ should be less than or equal to 30%, typically less than or equal to 20%, more typically less than or equal to 10%.

Advantageously, it has been discovered that heating a curable composition to a temperature $T_1$ that is greater than the $T_m$ of the stitching yarn while the conversion of the curable composition at $T_m$ or at $T_1$ is less than or equal to 30% allows for the production of a composite part that exhibits significant resistance to microcrack formation. Without wishing to be bound by theory, it is believed that at conversions of less than or equal to 30%, the matrix resin is in a state that is not viscous or firm enough to hold the shape of the stitching yarn. Thus, upon melting, the stitching yarn is capable of interdiffusion (to be explained below) with the matrix resin. The manifestation of such an effect is the significant reduction of microcracking in the final composite article.

Generally, heating the composition to temperature $T_1$ may be achieved in any manner known to those of ordinary skill in the art. In an embodiment, heating the curable composition to the temperature $T_1$ comprises heating the curable composition at a ramp rate of about 10° C./min or less. In another embodiment, heating the curable composition to the temperature $T_1$ comprises heating the curable composition at a ramp rate is from 0.2 to 10° C./min, typically from 0.5 to 2° C./min.

Any temperature $T_1$ greater than the melting temperature $T_m$ of the stitching yarn is suitable for performing the process. However, in an embodiment, the temperature $T_1$ is the cure temperature of the curable composition. The cure temperature of the curable composition refers to the temperature required for the composition to cure and depends typically on the resin system used in the curable composition. In some cases, the curable composition may be provided at a certain infusion temperature, which is typically greater than ambient temperature, i.e., greater than 25° C. Thus, in some embodiments, the curable composition is provided at an infusion temperature and $T_1$ is greater than both the infusion temperature and the $T_m$ of the stitching yarn.

In step c) of the process, the temperature $T_1$ is maintained or heating is conducted to a temperature $T_2$ for a time sufficient for the curable composition to be cured, thereby manufacturing the composite article.

During the curing process, the matrix resin forms cross-links throughout the curable composition and the resin is said to gel. Upon gelling, the matrix resin no longer flows, but rather behaves as a solid. The temperature at which gelling occurs is the gelation temperature, $T_{gel}$. The $T_{gel}$ of a certain composition is typically determined by conducting dynamic rheology measurements on a sample of curable composition using known methods. Typically, a temperature sweep is applied up to 300° C. at different frequencies (1, 3, 5 and 10 Hz). At a certain temperature, tan delta ($=G''/G'$) at different frequencies curves intersect, which is interpreted as the gel temperature of the polymer sample. In some embodiments, the $T_m$ of the stitching yarn is lower than the $T_{gel}$ of the curable composition.

When further heating is conducted to a temperature $T_2$, $T_2$ may be any suitable temperature greater than $T_1$ so long as the curing process is not impaired.

Any time sufficient for the curable composition to be cured is suitable for the practice of the process. However, in an embodiment, the time sufficient for the curable composition to be cured is less than or equal to 6 hours, typically less than or equal to 5 hours. In some embodiments, the time sufficient for the curable composition to be cured is less than or equal to 3 hours, typically less than or equal to 2 hours.

Surprisingly, composite articles made according to the process described herein exhibit a reduction in microcracking relative to composite articles made with stitching yarn not comprising a thermoplastic polymer and a linear density of less than or equal to 80 dtex using the same process or even composite articles made with the stitching yarn comprising a thermoplastic polymer and a linear density of less than or equal to 80 dtex but using a different process. Without wishing to be bound by theory, it is believed that a unique interaction, herein referred to as interdiffusion, between the matrix resin and the stitching yarn is obtained when the curable composition is heated to a temperature $T_1$ that is greater than the $T_m$ of the stitching yarn while the conversion of the curable composition is controlled to be less than or equal to 30%. It is believed that the stitching yarn of the non-crimp fabric and the matrix resin interdiffuse during the process such that there are little or no areas having only the chemical character of the stitching yarn. In other words, it is believed that the stitching yarn, as it melts, diffuses towards the matrix resin, while the matrix resin, which is not yet gelled and also not viscous or firm enough to take the shape of the stitching yarn, also diffuses towards the stitching yarn. Hence, there is an interdiffusion of the two materials within the curable composition that lead to desirable bulk properties, such as reduced microcracking.

The composite articles made according to the processes described herein may be evaluated for microcracking using methods known to those of ordinary skill in the art. Generally, a baseline evaluation of microcracking in a composite article is conducted as microcracking is known to occur as a result of the manufacturing process. For the purpose of evaluating microcracking due to exposure to thermal cycles and humid periods, samples of the composite articles may be subjected to conditions in which the surrounding temperature and/or humidity level is/are maintained for a specified amount of time and then adjusted to another temperature and/or humidity level at a specified rate and then maintained for a specified amount of time. The process, typically known as hygrothermal loading or cycling, may be repeated in accordance to the desire of the user to simulate real-world conditions in which the composite article may be employed. Once subjected to hygrothermal loading conditions, the composite articles may be observed for microcracks. Microcrack quantification is generally performed using an optical microscope in each ply and at the scale of the fibers.

The process, including the NCF fabrics, stitching yarns, support structures, and curable compositions used therein, as well as composite articles made are further illustrated by the following non-limiting examples.

EXAMPLES

Example 1. Manufacture of NCF Composites

Unless otherwise indicated, non-crimped fabrics (NCF) used herein were manufactured and provided by CHOMARAT (France). Carbon fiber (Toho Tenax IMS65 24k E23) was used to manufacture NCF on MAX 5 multi-axial equipment from Karl Mayer. The NCF was bi-oriented NCF in which 2 carbon fiber layers were superimposed (oriented first up layer +45° and second down layer −45°). The construction was Biax and the NCF width is 125 cm. The two layers were stitched with various stitching yarns. The stitching pattern was a zig-zag tricot stitching pattern, particularly Tricot E5 with stitching length 3.3 mm. The surface mass per ply is 196±5 g/m$^2$.

The biaxial NCF layups were impregnated with resin (EP2400 PRISM™, available from Solvay) using a vacuum-assisted resin infusion process and cured according to the instructions of the supplier. The resin was first heated to 100° C. in a vacuum oven and then vacuum degassed for 15 min. The infusion was made at 100° C. under a vacuum of about 10 mbar.

Two different curing profiles were used to cure the NCF composites. In one curing profile, profile A, the plate was heated at 2° C./min up to 180° C. and held at 180° C. for 2 hours and then cooled at 0.5° C./min down to 80° C. In another curing profile, profile B, the plate was heated at 2° C./min up to 110° C. and held at 110° C. for 12 hours then again heated at 2° C./min up to 180° C. and held at 180° C. for 2 hours and then cooled at 0.5° C./min down to 80° C. For profile A, the conversion of the NCF composite at 180° C. was about 6%. For profile B, the conversion of the NCF composite by the time it was heated to 180° C. was about 50%. The NCF composites made are summarized in Table 1 below.

TABLE 1

| Sample | Stitching yarn material | Stitching yarn linear density | Curing profile |
|---|---|---|---|
| 1 | Polyester PET | 36 dtex | A |
| 2 | Polyamide 10.10 ($T_m$ ~200° C.) | 39 dtex | A |
| 3 | Copolyamide K140 EMS ($T_m$ 130-145° C.) | 23 dtex | A |
| 4 | Copolyamide K140 EMS ($T_m$ 130-145° C.) | 55 dtex | A |
| 5 | Copolyamide K140 EMS ($T_m$ 130-145° C.) | 23 dtex | B |

Example 2. Hygrothermal Loading of NCF Composites

The NCF composites made according to Example 1 were loaded 2000 times with an accelerated hygrothermal load representative of the operating conditions typical of a subsonic jet during its life cycle (see FIG. 1). In this loading, there are 5 blocks of 400 cycles and each block is composed of two different loading phases: a first stationary phase "water absorption" where the samples are exposed to 95% RH for 12 hours at 50° C. and a second thermal-dry cycling phase. During this last phase, the samples are cycled 400 times in a temperature range of −54 to 80° C. with a temperature rate of 9° C./min. Each cycle lasts one hour (4×15 min), and this logically gives a duration of 15 min for each temperature rise/decrease and 15 min for each isothermal step at 80° C. and −54° C. It takes a total of about 3 months to reach the 2000 cycles. The minimum dimension of the samples to be cycled is 50×50 mm$^2$.

Example 3. Microcrack Quantification

Samples of the NCF composites (i.e., the cycled samples) subjected to the hygrothermal loading procedure described in Example 2 were taken at every 400 cycles, i.e., after 400, 800, 1200, 1600 and 2000 cycles. After each 400 hygro-thermal cycles (12 h of wet conditioning followed by 400 thermal cycles). The microcracking analysis samples with a size of 20×20×3.2 mm$^3$ were extracted from the center of the cycled samples. These samples for analysis were carefully cut with a micro-slitter to avoid causing damage by cutting. The observation sections (20×3.2 mm$^2$) were polished with an Automatic Polisher (Struers TegraPol). For each material, a microcracking analysis step (400 cycles, for example) requires preparations on a single cycled specimen (one cut and three polishing steps). Therefore, a complete analysis of 2000 cycles (5×400 hygrothermal cycles) requires 5 speci-mens for each type of material (one sample for one analysis step). The total microcracking density (density, cm−1) for each of the composites analyzed are summarized in Table 2 below.

TABLE 2

| Cycles | Sample 1 | Sample 2 | Sample 3 | Sample 4 | Sample 5 |
|---|---|---|---|---|---|
| 0 | 0 | 0 | 0 | 0 | 0 |
| 400 | 0.12 | 0.23 | 0 | 0.02 | 0 |
| 800 | 0.27 | 0.62 | 0 | 0.03 | 0.04 |
| 1200 | 0.44 | 0.91 | 0 | 0.06 | 0.24 |
| 1600 | 0.83 | 1.22 | 0 | 0.21 | 0.5 |
| 2000 | 1.06 | 1.41 | 0.02 | 0.27 | 0.8 |

Example 4. Characterization of NCF Composites

The cured NCF composites were examined by infrared spectroscopy. The chemical composition in the polymer stitching thread/cured epoxy resin area was determined using Infrared ATR Germanium technique in reflexion mode. Samples of 20×20 mm were cut and then coated in a Struers Caldo Fix epoxy resin polishing with a grain of 0.3 µm. Equipment used for the infrared analysis was a Bruker Vertex 70 and equipment used for microscopy was a Hype-rion 2000.

Composition profiles (mapping) were determined along a defined path every 10-30 µm in an area of the sample. Samples 3 and 5 were analyzed. The IR bands of interest were those corresponding to the polyamide of the stitching yarn, i.e., the C=O band at 1637 cm$^{-1}$ (band 1, stretching of C=O), NH at 1550 cm$^{-1}$ (band 2, deformation of N—H and stretching of C—N), and 3082 and 3086 cm$^{-1}$, harmon-ics of Band 2 at 1550 cm-1. For epoxy resin, the symmetric coupled vibrations of C—O and C—C of epoxy cycle at 1237 cm$^{-1}$ were of interest.

It was observed in sample 5 that the melting of the stitching yarn appears not to lead to the disappearance of the shape of the filaments of the stitching yarns. In the area of the stitching filament, the infrared spectrum show the vibra-tion bands attributed to the polyamide, suggesting that the chemical composition in this area is that of the stitching yarn. In the epoxy area, the infrared spectrum show the vibration bands attributed to the epoxy resin, suggesting that the chemical composition in this area is that of the matrix resin.

However, in sample 3, the melting of the stitching yarn appears to lead to the disappearance of the shape of the filaments of the stitching yarns. In whichever area was selected, whether it was a stitching filament area or an epoxy area, the infrared spectra showed both the vibration bands attributed to the polyamide and the vibration bands attributed to the epoxy resin, which suggests that the chemical composition in the chosen area was due to a mixture of both cured epoxy resin and the polymer from the stitching yarn.

What is claimed is:

1. A process for manufacturing a composite article, the process comprising:
   a) providing a curable composition, the curable composition comprising a matrix resin and a non-crimp fabric comprising at least one layer of unidirectionally oriented multifilament carbon yarns and a multifilament stitching yarn interlinking the multifilament carbon yarns, wherein the multifilament stitching yarn comprises a thermoplastic polymer and has a linear density of less than or equal to 80 dtex;
   b) heating the curable composition to a temperature $T_1$, wherein $T_1$ is greater than a melting temperature ($T_m$) of the multifilament stitching yarn and wherein a conversion of the matrix resin at $T_m$ or at $T_1$ is less than or equal to 30%; and
   c) maintaining the temperature $T_1$ or heating to a temperature $T_2$ for a time sufficient for the curable composition to be cured, thereby manufacturing the composite article.

2. The process according to claim 1, wherein the time sufficient for the curable composition to be cured is less than or equal to 6 hours.

3. The process according to claim 1, wherein the melting temperature of the multifilament stitching yarn is less than or equal to 230° C.

4. The process according to claim 1, wherein the melting temperature of the multifilament stitching yarn is from 70° C. to 200° C.

5. The process according to claim 1, wherein the multifilament stitching yarn comprises one or more thermoplastic fibers or filaments.

6. The process according to claim 1, wherein the thermoplastic polymer of the multifilament stitching yarn is a polymer selected from the group consisting of polyesters, polyamides, polyimides, polycarbonates, polyurethanes, and copolymers thereof.

7. The process according to claim 1, wherein the linear density of the multifilament stitching yarn is in a range of 1 to 55 dtex.

8. The process according to claim 1, wherein the non-crimp fabric is multiaxial and comprises more than one layer of unidirectionally oriented multifilament carbon yarns.

9. The process according to claim 1, wherein the non-crimp fabric further comprises a veil.

10. The process according to claim 1, wherein heating the curable composition to the temperature $T_1$ comprises heating the curable composition at a ramp rate of about 10° C./min or less.

11. The process according to claim 1, wherein heating the curable composition to the temperature $T_1$ comprises heating the curable composition at a ramp rate from 0.2 to 10° C./min.

12. The process according to claim 1, wherein the temperature $T_1$ is a cure temperature of the curable composition.

13. The process according to claim 1, wherein the $T_m$ of the multifilament stitching yarn is less than a temperature ($T_{gel}$) at which the curable composition gels.

14. The process according to claim 1, wherein the curable composition is provided at an infusion temperature and $T_1$ is greater than both the infusion temperature and the $T_m$ of the multifilament stitching yarn.

15. The process according to claim 1, wherein the thermoplastic polymer of the multifilament stitching yarn is a semi-crystalline polymer.

16. The process according to claim 1, wherein the matrix resin comprises epoxy resin.

17. The process according to claim 1, wherein the multifilament stitching yarn of the non-crimp fabric and the matrix resin interdiffuse during the process such that there are little or no areas having only the chemical character of the multifilament stitching yarn.

18. The process according to claim 1, wherein the composite article manufactured exhibits a reduction in microcracking relative to a composite article made with stitching yarn not comprising a thermoplastic polymer and a linear density of less than or equal to 80 dtex.

19. A composite article manufactured according to the process of claim 1.

20. A composite article made by a process comprising:
   a) providing a curable composition, the curable composition comprising a matrix resin and a non-crimp fabric comprising at least one layer of unidirectionally oriented multifilament carbon yarns and a multifilament stitching yarn interlinking the multifilament carbon yarns, wherein the multifilament stitching yarn comprises a thermoplastic polymer and has a linear density of less than or equal to 80 dtex;
   b) heating the curable composition to a temperature $T_1$, wherein $T_1$ is greater than a melting temperature ($T_m$) of the multifilament stitching yarn and wherein a conversion of the matrix resin at $T_m$ or at $T_1$ is less than or equal to 30%; and
   c) maintaining the temperature $T_1$ or heating to a temperature $T_2$ for a time sufficient for the curable composition to be cured.

* * * * *